United States Patent [19]

Geiser

[11] Patent Number: 5,084,621
[45] Date of Patent: Jan. 28, 1992

[54] RADIOMETRIC STANDARD INFRARED DETECTOR

[75] Inventor: A. G. Geiser, Cincinnati, Ohio

[73] Assignee: Cincinnati Electronics Corporation, Cincinnati, Ohio

[21] Appl. No.: 666,307

[22] Filed: Mar. 8, 1991

[51] Int. Cl.⁵ .............................. G01J 5/28; G01J 5/46
[52] U.S. Cl. ........................................ 250/353; 250/352; 250/370.15
[58] Field of Search ................ 250/353, 352, 370.15

[56] References Cited

U.S. PATENT DOCUMENTS

| | | | |
|---|---|---|---|
| 3,413,468 | 11/1968 | Astheimer | 250/338.1 |
| 3,601,611 | 8/1971 | Kendall, Sr. | 250/352 |
| 3,660,659 | 5/1972 | Eisenman et al. | 250/352 |
| 4,465,929 | 8/1984 | Edgar | 250/252.1 |
| 4,468,658 | 8/1984 | Rossin | 340/567 |
| 4,595,833 | 6/1986 | Sting | 250/353 |
| 4,709,152 | 11/1987 | Müller et al. | 250/342 |
| 4,710,629 | 12/1987 | Müller et al. | 250/342 |
| 4,754,139 | 6/1988 | Ennulat et al. | 250/332 |
| 4,775,792 | 10/1988 | Prost | 250/352 |
| 4,778,996 | 10/1988 | Baldwin et al. | 250/353 |
| 4,820,923 | 4/1989 | Wellman | 250/352 |
| 4,853,542 | 8/1989 | Milosevic et al. | 250/353 |
| 4,937,450 | 6/1990 | Wakabayashi et al. | 250/352 |

OTHER PUBLICATIONS

D. A. Harper, R. H. Hildebrand, R. Stiening and R. Winston, "Heat Trap: An Optimized Far Infrared Field Optics System", *Applied Optics*, vol. 15, No. 1 (Jan. 1976), pp. 53-60.

*Primary Examiner*—Constantine Hannaher
*Attorney, Agent, or Firm*—Lowe, Price, LeBlanc & Becker

[57] ABSTRACT

A radiometric standard detector responsive to infrared energy comprises an indium antimonide photovoltaic generator, a first mirror and a vacuum dewar including a cold finger and a window. The first mirror and photovoltaic generator are positioned in the dewar to form an optical energy trap. The generator is on the cold finger. A second mirror is external to the dewar. The window, both mirrors and the generator are positioned so a beam of the infrared energy is incident on the window and a portion of the infrared energy incident on the window is reflected from the window to the second mirror, then back to the window.

11 Claims, 1 Drawing Sheet

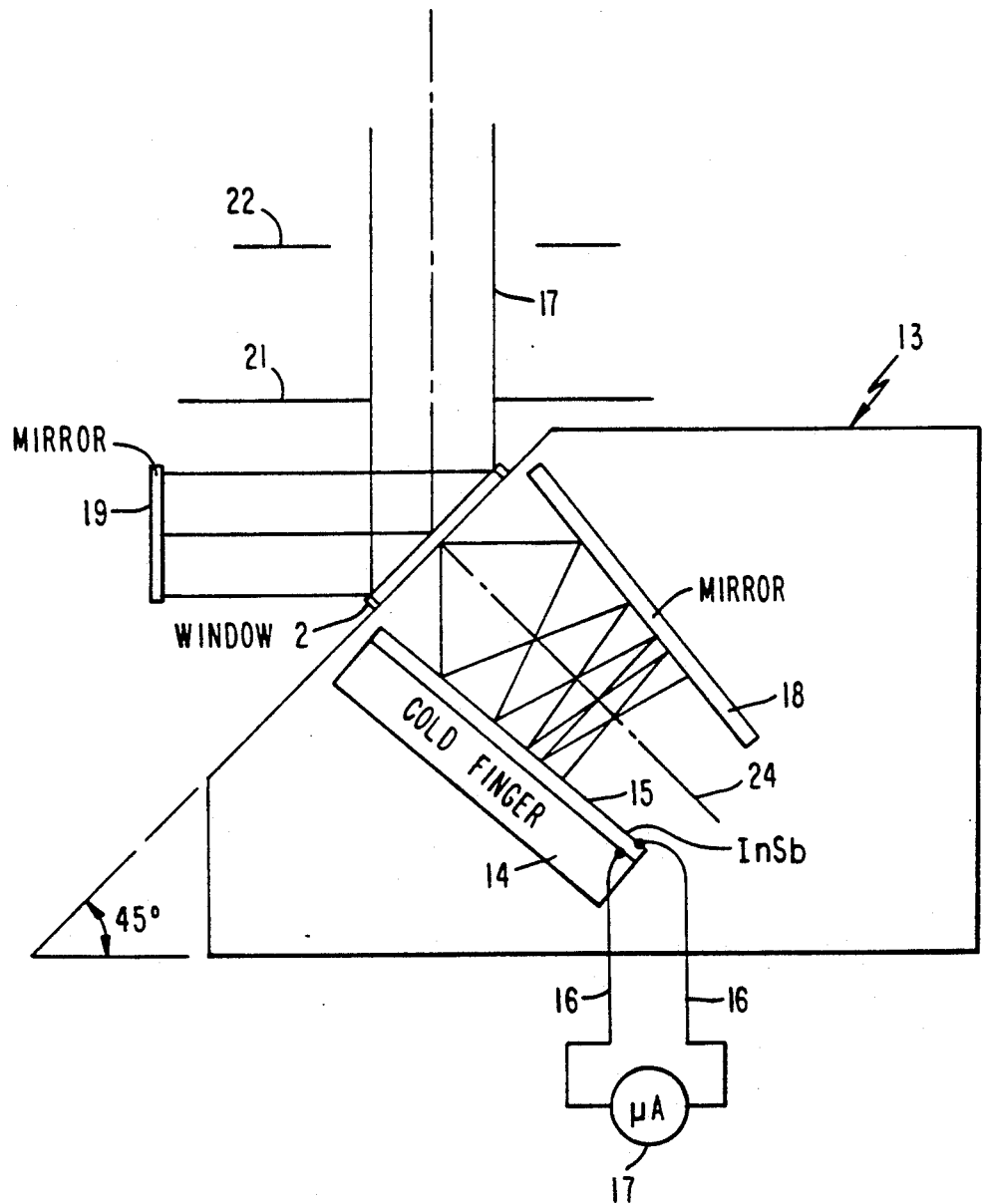

RADIOMETRIC STANDARD INFRARED DETECTOR

FIELD OF INVENTION

The present invention relates generally to radiometric standard infrared detectors and more particularly to a radiometric standard infrared detector including a dewar having a window that reflects some of the infrared energy incident thereon and a mirror for reflecting the infrared energy reflected from the window back through the window to an optical trap within the dewar, wherein the optical trap includes a photovoltaic generator responsive to the infrared energy.

BACKGROUND ART

There is a need to provide calibration equipment of black body sources in the infrared band from 2.5 to 5 micrometers and for calibrating collimators used in testing infrared detectors, optical systems and receivers in the 2.5–5 micrometer band. To provide such calibration, it is necessary to collect and accurately measure 2.5 to 5 micrometer infrared radiation incident on a detector aperture.

Previously one of three different techniques or structures were used for these calibration purposes, viz.: (1) electrically calibrated pyroelectric radiometers, (2) cryogenically cooled quantum detectors, and (3) performing calculations based on the physics of hot sources. Each of these prior art devices or procedures has a number of disadvantages.

Electrically calibrated pyrolytic radiometers generally have relatively low sensitivity, preventing these instruments from providing accurate results below about 1.0 microwatt of incident power. To calibrate sources used in infrared detector testing, accurate measurements must be performed at incident power levels between 1 and 100 picowatt.

Conventional cryogenically cooled infrared quantum detectors employing photovoltaic generators, usually fabricated of indium antimonide (InSb), must be operated in a vacuum dewar enclosure with an infrared transparent window. The InSb element is usually positioned on a cold finger in the vacuum dewar so it can be operated at liquid nitrogen temperatures. Inaccuracies occur because of external reflections, spurious responses due to internal reflection and losses due to reflection from the window. Reflection losses can be reduced by the use of anti-reflecting coatings on the window, but only at the expense of introducing non-uniformities in the spectral transmittance of the window. Typically the anti-reflecting coatings have different transmittivity properties over the 2.5–5 micrometer band of the infrared spectrum being tested.

Calculations based on the physics of infrared sources are based on measurements or assumptions of many parameters including source temperature and emissivity, as well as uniformity in aperture size and distance from the aperture to the source, in addition to spectral transmittance of filters and the atmosphere through which a beam from the source is transmitted. In actuality, these measurements and/or assumptions are frequently not accurate.

It is, therefore, an object of the present invention to provide a new and improved radiometric standard infrared detector.

Another object of the invention is to provide a new and improved radiometric standard infrared detector that collects and accurately measures infrared radiation incident on a detector aperture in the band from 2.5 to 5 micrometers.

A further object of the invention is to provide a new and improved radiometric standard infrared detector for calibration of black body sources and collimators used in testing infrared detectors, infrared optical systems and infrared receivers.

A further object of the invention is to provide a new and improved infrared radiometric standard detector having a linear response over the wavelength band from 2.5 to 5 micrometers and which is accurate for incident power levels as low as 1 picowatt.

A further object of the invention is to provide a new and improved cryogenically cooled infrared quantum detector employing a photovoltaic generator, wherein the detector does not suffer from inaccuracies produced by reflections from a window of a dewar in which the generator is located.

A further object of the invention is to provide a new and improved radiometric standard infrared detector employing a photovoltaic generator in a cryogenically cooled dewar wherein the need for anti-reflecting coatings on a window of the dewar is substantially eliminated.

A further object of the invention is to provide a new and improved radiometric standard infrared detector that does not require calculations based on measurement or assumptions of source temperature, source emissivity, source uniformity, distance between the source and an aperture of the detector or spectral transmittance of filters and the atmosphere.

THE INVENTION

In accordance with one aspect of the invention, a radiometric standard detector responsive to infrared energy comprises a photovoltaic generator for the infrared energy, a vacuum dewar including a cold finger and a window transparent to the infrared energy. The first mirror and generator are positioned in the dewar to form an optical energy trap, with the generator being on the cold finger. A second mirror for the infrared energy is positioned outside the dewar. The window, first and second mirrors and the generator are positioned so a beam of the infrared energy having a predetermined area is incident on the window. A portion of the infrared energy incident on the window is reflected from the window to the second mirror thence back to the window. The infrared energy directly incident on the window from the beam and reflected from the second mirror that propagates through the window is transmitted to the generator via the optical trap.

In the preferred embodiment, the first mirror and the photovoltaic generator are positioned so that the infrared energy in the beam propagates through the window directly to the generator. Some of the infrared energy incident on the generator is reflected from the generator to the first mirror and thence back to the generator. The infrared energy reflected from the second mirror and transmitted through the window propagates directly from the window to the first mirror and thence to the generator. The window has a planar surface inclined at 45° relative to the axis of the infrared beam incident thereon. The generator and first mirror have planar surfaces displaced by equal angles relative to a center line through the window so that these surfaces have a tendency to converge toward each other at a point remote from the window. The second mirror has a planar surface at 45° relative to the window planar surface. This arrangement causes virtually all of the optical energy incident on the window to be incident on the generator so the generator derives a current directly proportional to the product of the number of 2.5-5 micrometer photons incident on the window and the wavelength of the photons, except for a very small predictable number of photons that are reflected back along the axis of the incident energy via a path from the window to the second mirror, thence back to the window.

DESCRIPTION OF DRAWING

The single Figure is a schematic drawing of a preferred embodiment of the invention.

BEST MODE FOR CARRYING OUT THE INVENTION

Reference is now made to the Figure wherein infrared monochromatic beam 11, having a wavelength of suitable source, such as a laser, to be incident on sapphire window 12 that seals vacuum dewar 13 including cold finger 14. Photovoltaic generator 15, typically fabricated of indium antimonide (InSb) so that it has a high quantum efficiency and linear current to photon-per-second relationship, is positioned on cold finger 14 and maintained by the cold finger at a temperature in the range of approximately 100° K. Cold finger 14 is cooled by a liquid nitrogen refrigerator (not shown) in a manner known to those skilled in the art. To monitor the DC current generated by detector 15, electric leads 6 are connected to terminals of the detector and are connected to drive an appropriate indicator, schematically shown as microammeter 17. Positioned within dewar 13, in facing relationship with detector 4, is mirror 18 that uniformly reflects the entire 2.5-5 micrometer spectrum.

Outside of dewar 13 is mirror 19, that also uniformly reflects the enti-re 2.5-5 micrometer spectrum of beam 11. To prevent stray optical energy from being incident on window 12 and to define the cross-sectional area and shape of the beam incident on the window, baffle 22 and aperture plate 21 are located between the source of beam 11 and the window. Baffle 22 and aperture plate 21 have circular openings, with the diameter of the aperture in the baffle approximately 10 percent larger than the diameter of beam 11 and the aperture in plate 22 having a diameter to define the area of the beam incident on the window.

Window 12 is positioned so that the axis of beam 11 is inclined at 45° with respect to the window. External mirror 19 is inclined at 45° with respect to the planar surface of the window 12 on which beam 11 is incident. External mirror 19 is located so that optical energy reflected from window 12 in the 2.5-5 micrometer range is incident on the external mirror and reflected by the external mirror back to the planar surface of the window on which beam 11 is initially incident. Virtually all of the infrared energy of beam 11 incident on window 12 thereby is transmitted through the window to an optical energy (light) trap comprising photovoltaic generator 15 and internal mirror 18 in dewar 13. Detector 15 and internal mirror 18 are arranged so that the optical energy of beam 11 directly transmitted through window 12 is directly incident on detector 15. Some of the optical energy incident on detector 15 is reflected from detector 15 toward internal mirror 18, thence back to detector 15. Multiple reflections occur between detector 15 and internal mirror 18. Internal mirror 18 is arranged so that the optical energy reflected from external mirror 19 and transmitted directly through window 12 is incident directly on internal mirror 18. The optical energy transmitted through window 12 and directly incident on internal mirror 18 is reflected from the internal mirror to detector 15.

The geometry of detector 15 and internal mirror 18 is such that virtually all of the optical energy initially incident on detector 15 from beam 11 and incident on internal mirror 18 from external mirror 19 is collected by the detector. To this end, detector 15 and internal mirror 18 include planar surfaces on which the energy from beam 11 and from external mirror 19 are incident. These planar surfaces are canted at equal angles with respect to center line 24 of window 12 (i.e., a line at a right angle to the surface of the window and through the centroid of the window). The edges of detector 15 and internal mirror 18 closest to window 12 are spaced farther from each other than the edges of the detector and internal mirror which are remote from the window. The edges of detector 15 and internal mirror 18 in closest proximity to window 12 are spaced from each other by a distance approximately equal to, but slightly larger than, the diameter of the window. Typically, the planar surfaces of detector 15 and internal mirror 18 are approximately 5° displaced from center line 24 of window 12. Because of the equal displacement angles of the planar surfaces of detector 5 and internal mirror 18 from center line 24 of window 2, the same effects are provided for the beam 11 transmitted directly through window 12 to the detector and for the beam reflected by external mirror 19 to internal mirror 18 by way of window 12. In a preferred embodiment beam 11 has a diameter of about ⅛" and the lengths of detector 15 and internal mirror 18 are both approximately ⅜".

Detector 15 collects virtually all of the infrared radiation incident on window 12 and generates a current $I = Nq\lambda/hc$, where N is the number of incident photons per second, q is the charge of an electron, h is Planck's constant, c is the velocity of light and $\lambda$ is the wavelength of the incident optical radiation. Hence, detector 15 has the theoretical linear spectral response curve of an ideal quantum detector. This is because virtually every photon of optical energy in beam 11 is converted by detector 15 into current, as indicated by the above equation. The structure is a radiometrically calibrated detector for the 2.5-5 micrometer band which directly measures picowatt levels of incident radiation, has a calibration factor calculable directly from fundamental physical constants, has an ideal linear spectral response curve and does not depend on assumptions concerning test arrangements to achieve accuracy, except for measurements for the area of the aperture of apertured plate 21 and the wavelength, $\lambda$, of the optical source of beam 11.

The above and still further objects, features and advantages of the present invention will become apparent upon consideration of the following detailed description of a specific embodiment thereof, especially when taken in conjunction with the accompanying drawings. For example, if beam 11 is sufficiently collimated, it may be possible to eliminate baffle 22.

I claim:

1. A radiometric standard detector responsive to infrared energy comprising a photovoltaic generator for the infrared energy, a first mirror for the infrared energy, a vacuum dewar including a cold finger and a window transparent to the infrared energy, said first mirror and generator being positioned in the dewar to form an optical energy trap, the generator being on the cold finger, a second mirror for the infrared energy positioned outside of the dewar; the window, first and second mirrors and the generator being positioned so a beam of the infrared energy having a predetermined area is incident on the window and a portion of the infrared energy incident on the window is reflected from the window to the second mirror thence back to the window, infrared energy in the beam directly incident on the window being transmitted to the generator via the optical trap and being reflected from the window to the second mirror to be incident on the window.

2. The detector of claim 1 wherein the first mirror and the generator are positioned so that: (a) the infrared energy in the beam propagates through the window directly to the generator, (b) some of the infrared energy is reflected from the generator to the first mirror and thence back to the generator, and (c) the infrared energy reflected from the second mirror and transmitted through the window propagates directly from the window to the first mirror and thence to the generator.

3. The detector of claim 2 wherein the beam incident on the window travels along a predetermined optical axis, the window having a planar surface inclined at 45° relative to the axis of the infrared beam incident thereon, the second mirror having a planar surface on which the beam reflected from the window is incident, the second mirror planar surface being inclined at 45° relative to the window planar surface.

4. The detector of claim 3 wherein the generator and first mirror have planar surfaces on which the infrared energy is incident, the planar surfaces of the generator and first mirror having a tendency to converge at a point remote from the window along a center line of the window at right angles to the window planar surface.

5. The detector of claim 4 wherein edges of the generator and first mirror proximate the window are (a) spaced from each other by a distance approximately equal to the distance separating opposite sides of the window and (b) are aligned with the opposite sides of the window.

6. The detector of claim 5 further including means forming an aperture in the beam path for defining the area and shape of the energy in the beam incident on the window.

7. The detector of claim 6 further including means forming a baffle for substantially preventing stray optical energy not in the beam from propagating through the aperture to the window.

8. The detector of claim 1 wherein the generator and first mirror have planar surfaces on which the infrared energy is incident, the planar surfaces of the generator and first mirror having a tendency to converge at a point remote from the window along a center line of the window at right angles to the window planar surface.

9. The detector of claim 8 wherein edges of the generator and first mirror proximate the window are (a) spaced from each other by a distance approximately equal to the distance separating opposite sides of the window and (b) are aligned with the opposite sides of the window.

10. The detector of claim 1 further including means forming an aperture in the beam path for defining the area and shape of the energy in the beam incident on the window.

11. The detector of claim 10 further including means forming a baffle for substantially preventing stray optical energy not in the beam from propagating through the aperture to the window.

* * * * *